May 21, 1963 G. G. HOBERG ET AL 3,090,947

MAGNETIC STORAGE SYSTEM

Original Filed Oct. 16, 1956 2 Sheets-Sheet 1

INVENTORS
GEORGE G. HOBERG
OTTO HOHNECKER
BY
[signature]
ATTORNEY

MAGNETIC STORAGE SYSTEM

Original Filed Oct. 16, 1956 2 Sheets-Sheet 2

INVENTORS
GEORGE G. HOBERG
OTTO HOHNECKER
BY
[signature]
ATTORNEY

United States Patent Office 3,090,947

Patented May 21, 1963

3,090,947

MAGNETIC STORAGE SYSTEM

George G. Hoberg, Berwyn, Pa., and Otto Hohnecker, Midland Park, N.J., assignors to Burroughs Corporation, Detroit, Mich., a corporation of Michigan Continuation of application Ser. No. 616,318, Oct. 16, 1956. This application Feb. 17, 1960, Ser. No. 9,392
15 Claims. (Cl. 340—174.1)

This invention relates to a storage or memory system for use with a data processing system. More particularly, the invention relates to a high-speed magnetic-disk memory. This application is a continuation of application for U.S. patent Serial No. 616,318, filed October 16, 1956 now abandoned, bearing the names of George G. Hoberg and Otto Hohnecker, entitled "Magnetic Storage System."

A principal object of the invention is to provide, for use with a data processing system, an external memory of large capacity and in a form readily and directly usable by the data processing apparatus without the interposition of converters or speed-matching buffer circuits.

As is well known, data processing systems frequently require a large capacity external memory in the form of a record which may be stored away until needed. In some systems, the external memory is in the form of punched cards; in others, punched tape; in still others, magnetic tape. These forms of external memory are not adapted to high speed operation and necessitate the use of converters and speed-matching buffer stages to put the stored data into a form which is usable at the high speeds required by the data processing circuits.

According to the present invention, a large external memory is provided composed of magnetic-surfaced disks which may be placed on a turntable and driven rotationally at high speed, the disks being readily removable for storage and to make the turntable available to other disks. The speed at which the turntable is driven is sufficiently high to permit the data delivered by the data processing circuits to be recorded directly on the magnetic disks, and the data read from the disks to be used directly by the data processing circuits, in each case without the interposition of a buffer memory. It will be readily understod that if the speed of the turntable were slow, for example, of the order of that used in phonographs, it would be necessary to provide magnetic shift registers or other forms of buffer memory to match the then slow recording and reading speeds with the high speeds required by the data processing circuits. The need for buffer memory stages is avoided, in the system of the present invention, by the use of a high speed turntable and by means which permit the high speed turntable to be used.

The present invention contemplates that a method of magnetic recording known as selective alteration will or may be used. This method of recording has certain known advantages and is widely used. In selective alteration, at least as the term is used in this specification, each elemental area or cell of the magnetic-record surface is capable of representing a unit of information indicated by an appropriate level of or change in surface magnetization, which unit of information will hereinafter be referred to as a "bit," and each "bit" of a prior recording is adapted selectively to be altered, or to remain unaltered, by a later recording. Stated another way, in selective alteration a prior recording is not erased before entering a succeeding recording. Rather, the earlier recording is obliterated by the later, since each bit of the later data is written right over the corresponding bits of the previous data, the polarity of some of the cells being changed by the new writing, the polarity of other cells remaining unchanged, according to the relationship between the old and new information. It will be seen that, in the selective alteration method of magnetic recording, it is important that each succeeding bit be applied to the magnetic surface at precisely the location of the elemental area or cell occupied by the previous bit. If the recording head is not accurately located with respect to the track, or, if the instant of recording does not correspond exactly with that of the previously recorded data, the later recording will not be in precise registration with the earlier, and the prior bits of data will not be completely altered by the later. Thus, remnants of bits will remain to clutter up the recording and to jeopardize the accuracy of the subsequent readings.

In the system of the present invention, where the external memory is composed of a large number of magnetic disks each of which is intended to be removed from the turntable on which the recording takes place, stored away, and later brought forth and placed again on the same turntable for reading of the recorded data and the recording of new data, if a selective alteration form of recording is to be employed, two requirements must be met; one, that each disk be replaced on the turnable in precisely the same position previously occupied, both as to center location and as to angular orientation, and two, that the time instants of the succeeding recording be exactly in phase with those of the earlier recording.

The present invention provides means for meeting both of the above requirements. In one embodiment, the means for achieving the first requirement is a pair of notches which are provided in each magnetic disk and which cooperate with positioning means located on the surface of the turntable, the latter means, in one embodiment, taking the form of guide posts, thrust means and clamping fingers. The second requirement is met by using timing signals which have a fixed time relation to the bits recorded on the magnetic disks. This is accomplished by inscribing the timing signals on the surface of the turntable. It will be appreciated that if the timing signals were to be obtained from a fixed source such that the time spacing between timing signals were equal and invariable, then the slight variations which unavoidably occur in the speed of the turntable due, for example, to line voltage variations, would tend to prevent a succeeding recording from occupying precisely the same cell locations as a prior recording. This is avoided, in accordance with the present invention, by using timing signals which are inscribed on the turntable itself, since any variations in turntable speed affect in like manner the time spacing between timing signals and cell locations.

Accordingly, another object of the present invention may be said to be the provision of means, in an external memory system composed of removable magnetic disks and in which a selective alteration method of recording is used, for enabling a succeeding recording on a disk to be in precise registration with a prior recording on that disk.

Since the system of the present application is capable of use where selective alteration of pulse-type digital data is required, it can also be used where the disk recording involves other forms of data representation, such as analogue representation of quantities, which might require similar precision in registration between the data and such reference positions and signals as are provided by the disk orienting means and the timing tracks.

It should be mentioned here that the present invention contemplates that the timing signals which are inscribed on the turntable will or may be the only timing signals available to and used in the data processing system, these timing signals being employed either directly or in conjunction with other circuits such as flip flops to generate control or gate pulses to control accurately the timing of the various operations performed throughout the data processing system.

Thus far, we have referred only to the external memory. Data processing systems, ordinarily at least, also require an internal memory which may be said to be a storage always available automatically to and controlled directly by the system.. In some systems, the internal memory is in the form of a magnetic drum; in others, an array or matrix of magnetic cores; and in still others, a cathode ray storage tube. In the system of the present invention, it is apparent that the internal memory must be be elsewhere than on the removable magnetic disks since the information of the disk is not always accessible to the data processing apparatus. According to the present invention the internal memory is recorded on the turntable itself where it is always accessible.

In order that the overall operating speed of the data processing system may not be unduly impaired, it is desirable, of course, that the replacement on the turntable of one magnetic disk with another be accomplished in a minimum amount of time. Accordingly, dynamic braking and indexing means are provided to quickly bring the high speed turntable to a stop in a preselected indexed position which is so related to the turntable-mounted disk-positioning means as to facilitate such rapid change of disks.

A further object of the present invention may, therefore, be said to be the provision of means, in a data processing system employing removable magnetic disks as an external memory, for enabling the magnetic disks to be changed in a minimum amount of time.

Data processing systems also usually include control pulses to direct the sequence of operations, to interpret coded instructions, and to initiate the signals to the various processing circuits to execute the instructions. In the system of the present application, such control pulses are recorded on the turntable.

Data processing systems also ordinarily include program instructions. In the system of the present application, the program instructions may be recorded in part on the turntable and in part on the replaceable magnetic disks. For example, program-modification instructions may be recorded on selected disks and used to alter the program recorded on the turntable. Or sub-routine program instructions may be recorded on the disks and used in combination with a principal program recorded on the turntable.

Data processing systems also frequently include so-called revolver or recirculating memory tracks. In the system of the present application, such revolver or recirculating memory tracks may be included either on the turntable or on the magnetic disks, or on both.

A typical example of how the magnetic-disk memory system of the present invention is used in a data processing system is where the revolver accumulator and internal memory tracks on the turntable are used to store data representing the sum of a number of entries obtained from a number of different removable disks, the timing signals being obtained from the turntable.

It will be understood that, if desired, timing signals could also be inscribed on each disk, as well as on the turntable. Such timing signals on the disks may either be pre-inscribed or may be written thereon using the timing signals on the turntable as the source. It is, however, not advantageous to place timing signals also on the disks, and the present invention is intended to make the same unnecessary. To have timing signals on each disk would not only use up disk surface and require additional reading heads, but would necessitate the use of additional circuit and switching means since the timing on the disk would not necessarily be phased with that on the turntable. Thus, a revolver type of accumulator could not be used, at least not directly, and a static type of register would be required. Moreover, the problem of accurately positioning the removable disks on the turntable would not be completely avoided; it would still be necessary to accurately locate the center of the disk so that the heads would be in registry with the tracks.

The present invention contemplates, therefore, that timing signals will not be inscribed on each individual disk, and that a single source of timing signals will be provided, namely, markers pre-inscribed on the turntable. While other means of using these turntable-inscribed marker signals could be used, such for example, as deriving error signals to indicate the timing relationships between the turntable timing markers and the bit readings from the disks and using such error signals in combination with delay circuits, buffer stages and other electronic means to compensate for any time differences, the present invention employs mechanical means for locating the removable disks on the turntable with sufficient accuracy, both as to location of center and angular orientation, to assure that the data are recorded on and read from the disks in precise registration with respect to the discrete elemental areas or cells of magnetic information.

While the foregoing is a summary, the invention will be best understood from a consideration of the following detailed description of one embodiment taken together with the drawing wherein.

Figure 1:
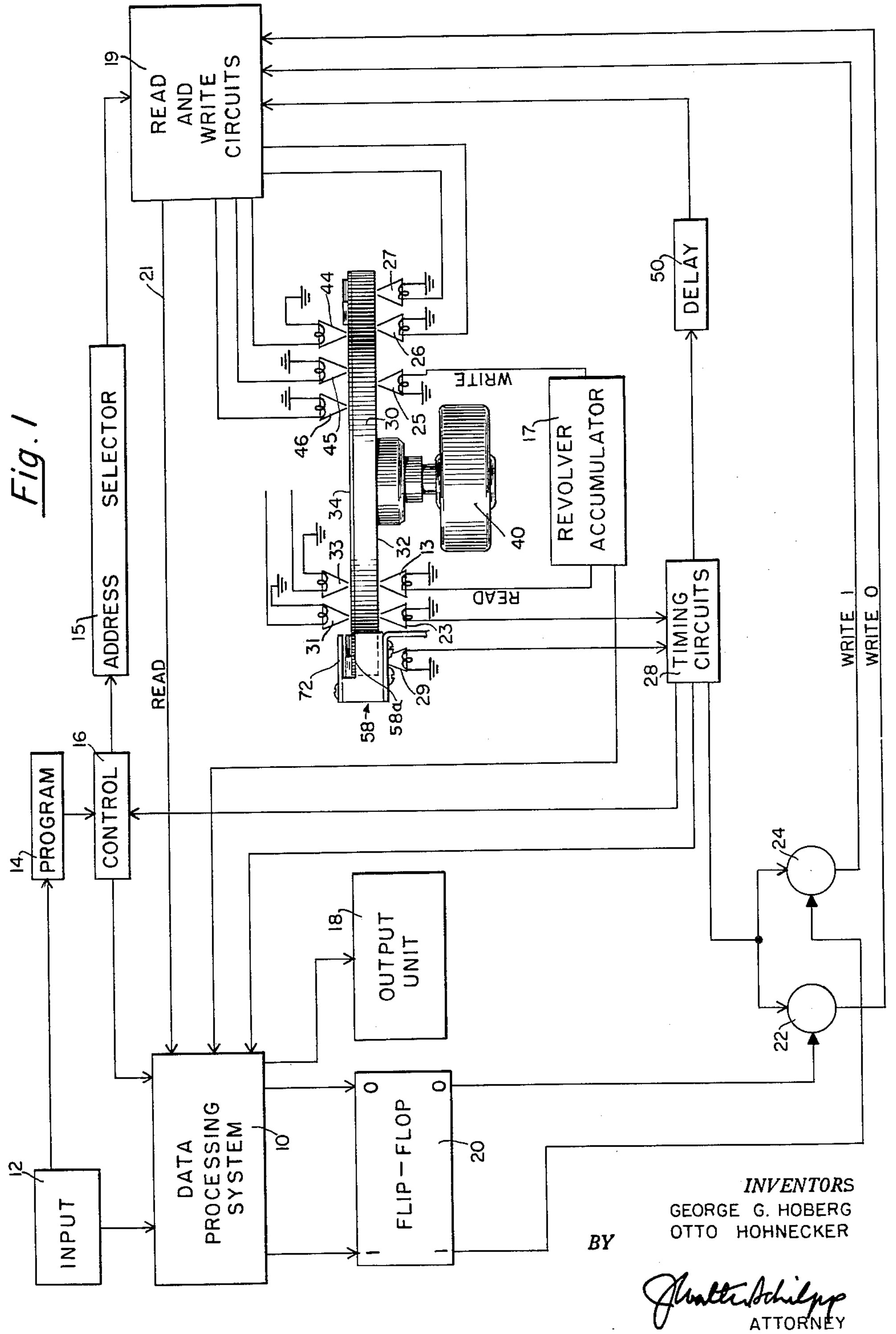
FIG. 1 is a diagrammatic illustration of a computer system employing the present invention.

Referring now to FIG. 1, there is shown, partly in block diagram form, a digital computer system comprising a data processing system 10 to which input data may be applied from an external source 12 which may, for example, be a machine for handling punched tape. Also applied to the data processing system 10 by way of lead 21 are informational data picked up from the replaceable magnetic disks which constitute the external memory, one of which, disk 34, is shown in FIG. 1. As shown, the data recorded on the magnetic disk 34 is picked up by one of the heads 44, 45, 46, these heads being representative of the considerably larger number of heads used in an actual machine. The particular head selected for reading at any given time is determined by the read circuit of block 19 under the control of the address selector 15. The latter is, in turn, controlled by control circuit 16 under instructions from the program unit 14. The timing of the data read and fed over lead 21 to the data processing system 10 is under the control of the timing pulses picked up, in accordance with the present invention, from one or more tracks on the under-surface of turntable 30, as by heads 23, 29, and applied to the read and write circuits 19, the data processing system 10, and the control circuits 16 by way of the timing circuits 28. The output of the data processing system 10 is applied to an output unit 18 which may, for example, be a printer.

In FIG. 1, the output of the data processing system 10 is also shown applied to a flip flop 20 and the outputs of flip flop 20 are shown applied to a pair of coincidence gates 22, 24 only one of which is open at a time, the other being closed, the condition of the gate being determined by the state of the flip flop 20. As shown arbitrarily in FIG. 1, when flip flop 20 is in the "0" state, gate 22 is open and gate 24 is closed, whereas when flip flop 20 is in the "1" state, gate 24 is open and gate 22 is closed.

In accordance with the presence invention, as has already been indicated, timing pulses are inscribed or recorded on one or more tracks on the undersurface 32 of the turntable 30. In FIG. 1, marker or digit timing pulses are assumed to be magnetically recorded on a track read by head 23, and word timing pulses are assumed to be recorded on a track read by head 29. Other timing pulses, such as once-per-revolution pulses, may be recorded on other tracks which, to avoid undue complexity, are not shown. The digit timing pulses read by head 23 are applied by way of circuits 28 to the gates 22 and 24. Thus, pulses will pass through gates 22, 24 at time instants controlled by the digit timing pulses and according to the state of the flip flop 20. The gate output pulses representing the digital numbers "1" or "0" are applied by way of the write circuits of block 19 to one of the heads 44, 45, 46, the particular head selected being determined by the address selector 15; and the selected head is effective to record the gate output pulses on the magnetizable surface of one of the removable disks, for example, the disk 34. The gate output pulses may also be applied by way of the write circuits of block 19 to one or more of the heads 26, 27, and by means of the selected head the pulses are recorded on the magnetizable under-surface 32 of the turntable 30. The data recorded by heads 26, 27 may comprise the internal memory of the computer system. It will be understood, of course, that heads 26, 27 are merely representative and that the number of heads used will depend upon requirements. Whether the output pulses from gates 22, 24 are recorded only on the removable disk 34, or only on the under-surface of the turntable 32, or on both, and on which track or tracks, is determined, of course, by the write circuits of block 19 under the control of the address selector 15 as controlled in turn by the control circuit 16 and the program circuits 14.

Any of the group of turntable heads represented by 26, 27 may be used, if desired, for recording and reading of any control information which it may be desired to record on the under-surface 32 of the turntable. This control information may reach the selected head or heads by way of the data processing system 10, flip flop 20, gates 22, 24, and the write circuits of block 19.

The under-surface of the turntable may also include a track employed as a revolver or recirculating memory, as is indicated in FIG. 1 by the read head 13, the write head 25 and the revolver accumulator 17. It will be understood that the read and write heads 13, 25, operate on the same track.

In summary, FIG. 1 illustrates a turntable 30 on the magnetizable under-surface 32 of which timing pulses and an internal memory are recorded, together, if desired, with a recirculating memory, control, and program information, and in which the informational data of the external memory are recorded on removable disks represented in FIG. 1 by disk 34. It is the information on the turntable which ties together and coordinates the data on the various removable records.

Assume now that disk 34, having been removed from the turntable and placed in a storage cabinet for some time, has now been returned to the turntable where it is required to occupy, within very close tolerances, the same location of center and the same angular orientation relative to the turntable, that previously obtained. Assume that such accurate placement of disk 34 has been accomplished, the means for such accomplishment being described more fully hereinafter. The data previously recorded on disk 34 may now be picked up, as by head 44 functioning as a read head, and applied by way of the read circuits of block 19 to the data processing system 10 by way of lead 21. The passage of the data pulses through circuit 19 is controlled by timing pulses picked up from the underside of the turntable by read head 23 and delayed a proper amount by means 50 to compensate for the fact that the recording process may require clocking of read-back signals at a time in the basic timing-pulse cycle which may be different from the time at which a writing pulse occurs.

As already indicated hereinbefore, for the system now being described to function properly, it is important that the disk be accurately replaced on the turntable in the same location and same orientation which previously existed during the recording of the data thereon. While the means by which this is accomplished is shown diagrammatically in FIG. 2, the detailed structure is shown, described and claimed in co-pending application of Otto Hohnecker, filed May 29, 1956, Serial No. 587,989, now Patent No. 2,937,916 and assigned to the assignee of the present application.

Figures 2, 4:
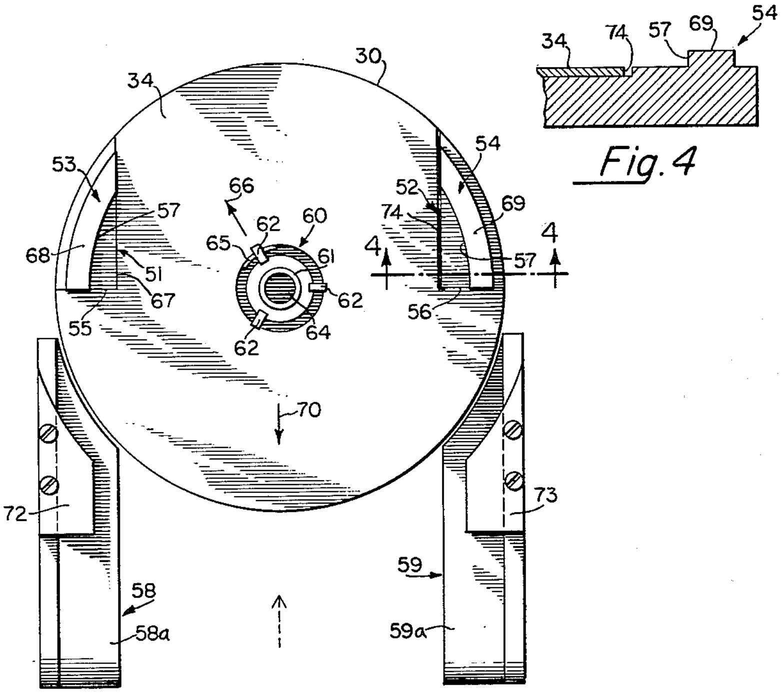
FIG. 2 is a top view of the turntable showing diagrammatically the means employed to obtain accurate positioning of the disk on the turntable.
FIG. 4 is a cross-section along the line 4—4 of FIG. 2.

Referring now to FIG. 2, which is a diagrammatic view looking down on the turntable 30, the disk 34 is shown as having a circular periphery substantially coincident with that of the turntable except for the L-shaped notched portions 51, 52 designed to cooperate with stop members 53, 54 fixed to the upper-face of the turntable at opposite sides thereof. As shown in FIG. 2, and also in FIG. 4 which is a cross-section taken along the line 4—4 of FIG. 2, stop members 53, 54 have straight-edge bottom portions 55, 56, preferably located on the transverse diameter of the turntable which function as stops for the transverse straight-edge lower portions of notches 51, 52 of the disk 34. Each of the stop members 53, 54 has a raised portion 68, 69 having an arcuate inner face 57 generated on a radius preferably having the same center as the turntable. The inner portion of each stop member is so dimensioned as to permit the upper portion of disk 34 to slide into place between them, the arcuate faces 57 serving to deflect a misplaced entering disk into its proper position between the stops.

To assist in the rapid manual placement of a disk on the surface of the turntable in a proper position to be guided by stop members 53, 54 into its final and accurately positioned location, L-shaped shelf members 58, 59 are provided. The surfaces 58*a*, 59*a* of the shelf members are either in the same plane as or slightly above the surface of the turntable, as shown by 58*a* in FIG. 1, so that a record may be placed on the shelf and slid forward in the direction of the dotted arrow (FIG. 2) on to the turntable. Guard members 72, 73 overhang the shelf surfaces and prevent the disk, as it is slid on to the turntable, from being raised at an angle sufficient to cause the disk to contact the disk recording-reading heads, such as 31, 33, 44, 45 and 46 (FIG. 1). These heads, as well as others not shown, are supported by known and suitable means above the turntable.

It will be seen from the above that a disk such as disk 34, can be slid across the face of the turntable, between the turntable surface and the overhanging recording or reading heads, until the transverse straight-edged portions of the disk notches 51, 52 seat against the bottom edges 55, 56 of the stop members 53, 54.

During the time that disks are being removed from and placed on the turntable, a retractable latch assembly 60, located in a well at the center of the turntable, is retracted below the turntable surface, as by depressing bushing 61. The function of retractable latch assembly 60 is to accurately position and positively lock disk 34 in place upon the turntable. The assembly 60 includes three retractable latch fingers 62 which lie below the plane of the upper surface of the turntable when the latch assembly is in retracted position so that the disk can be slid freely along the surface without striking the fingers. When actuated to locking position, as by depressing push-button 64, the fingers 62 swing upwardly through the hole to overlie the disk. The latch assembly carries a pusher member 65 having an arcuate face, the radius of which has the same axis as the turntable center hole. The pusher member 65 engages the rim of the hole of the disk and thrusts the disk angularly in the direction indicated by the arrow 66, which may, for example, be 30° off the normal. This angular thrust forces both the transverse and vertical edges of the left disk-notch into firm contact with the transverse and vertical edges 55, 67, respectively, of the left stop member, and also forces the transverse edge of the right disk-notch into firm contact with bottom edge 56 of the right stop member. In this manner, positioning of a disk within close tolerances is accomplished. As is shown clearly in FIG. 4, there is ordinarily no firm contact between the vertical edge 74 of the right disk-notch and the vertical edge of the right stop member 54, the same not being necessary to accurate positioning, and the slight space available along this edge facilitating placement of the disk on the turntable without encountering binding.

As previously indicated, the structures of the retractable latch assembly 60 and of the stop members 53, 54 are shown and described in detail, and claimed, in the aforementioned copending application of Otto Hohnecker, one of the joint inventors of the invention described and claimed in the present application.

Attention now is called to the fact that during operation turntable 30 is driven at high speed, for example 3600 r.p.m., by motor 40 (FIG. 1) and that when a disk is to be changed considerable time could be lost if it were necessary to wait for turntable 34 to come to rest after motor 40 is shut off. To reduce the time required for record changing, motor 40 is designed and built to provide three functions; first, to accelerate rapidly to, and thereafter to drive the turntable at, a constant speed; second, to dynamically brake the turntable in response to a control switch; and third, to bring the turntable to a stop in a preselected indexed position, indicated in FIG. 2 by the solid arrow 70. It will be seen that in this position, the stop members of the turntable are in optimum position to permit the removal of the in-place record and to receive the replacement record.

Figure 3:
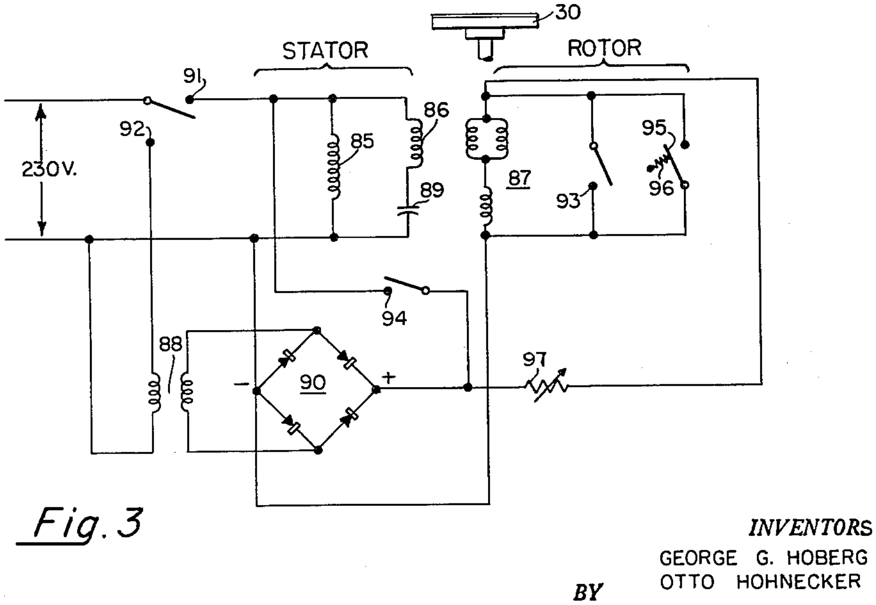
FIG. 3 is a diagram of the circuit of the turntable motor employed to effect braking and indexing.

The manner in which motor 40 functions can be most readily explained by considering the circuit of motor 40 shown in FIG. 3. As there shown, motor 40 is a single phase induction motor having a main stator winding 85 and also an auxiliary stator winding 86 which together with condenser 89 provides the necessary magnetic-field asymmetry to get the motor started. The rotor windings, represented by 87, provide the positioning feature, as will be described. The motor assembly includes a step-down transformer 88 which steps the line voltage (230 volts) down to 40 volts. The assembly also includes a full-wave rectifier 90 comprising four selenium rectifiers.

To start the motor, the switches to points 91 and 93 are closed and the switches to points 92 and 94 are open. This places full line voltages across the main and auxiliary windings of the stator and the motor rapidly accelerates to rated speed, 3600 r.p.m. During acceleration and running at rated speed, the rotor windings 87 are shorted by the closed switch at point 93, and also by a centrifugal switch 95 which is closed centrifugally against the action of a bias, indicated in FIG. 3 by the spring 96.

To stop the motor, the switches to points 91 and 93 are opened and the switches to points 92 and 94 are closed. When this is done, the line voltage is removed from across the motor stator and is placed across step-down transformer 88. The D.-C. secondary voltage delivered by full-wave rectifier 90 is applied across the stator winding 85 and a portion thereof, as determined by variable resistor 97, is applied across the rotor windings 87. Direct current flows immediately through stator winding 85 to effect dynamic braking of the motor. Rotor windings 87 remain shorted, however, by closed centrifugal switch 95 until the speed of the motor falls below a preselected low speed, for example, 400 r.p.m., at which time switch 95 opens and D.-C. current from rectifier 90 flows through the rotor windings 87. The effect of having direct current flowing in the stator winding 85 and also in the rotor windings 87 is to bring the rotor to a complete stop in a particular position indicated in FIG. 2 by the arrow 70 and hold the rotor in this position for the duration of this cycle or until the curent is shut off.

No claim is made in this application to the positioning motor per se. This general type of motor is described, for example, in an article by C. S. Allen and H. Shapiro, entitled "Remote Rotational Positioning," published in "Machine Design," April 1953, pages 243–247.

We have found that by using the particular embodiment of the invention described in this application, the high speed (3600 r.p.m.) turntable may be brought to a stop, the in-place disk removed from and the replacement disk placed on the turntable, and the turntable brought up to full speed, all in a matter of 20 seconds or less.

While the timing pulses have been shown recorded on the under-surface of the turntable, the timing pulses may, if desired, be placed on the turntable's upper surface. For example, where a turntable is employed having a larger diameter than that of the disks, the timing pulses may be recorded on an area of the turntable's upper surface extending beyond the radius of the disks.

It should perhaps also be mentioned that in commercial practice the timing tracks will, ordinarily at least, be inscribed on the turntable at the factory rather than by the user of the computer.

Also while the disks have been described in the present specification and shown in FIG. 2 as having a pair of L-shaped notches, other configurations may be used to accomplish the described result. For example, each disk may be substantially circular with a pair of ears, located at opposite edges, cooperating with the turntable's stop members to effect accurate positioning and orientation of the disk.

It is also to be understood that while the disks are referred to in the specification and also in the claims as magnetic disks, they may preferably be comprised of a non-magnetic material, such as aluminum, coated or plated with a magnetic material, such as iron oxide, or a ferro-magnetic alloy or a ferrite.

It is also pointed out that the disks may either warp slightly or for other reasons fail to be perfectly flat, and that, as a consequence, the surface of the rotating disk, at a particular head, will vary slightly from a fixed plane. Compensation for such variation may be furnished by the use of movable air-floated heads, such as described and claimed in the copending application of Otto Hohnecker, Serial No. 587,990, filed May 29, 1956, now Patent No. 2,950,354, and assigned to the assignee of the present application.

What is claimed is:

1. In a data storage system; a turntable having a plane magnetic surface on which timing signals are recorded; a disk removable with respect to said turntable, said disk having at least one plane magnetic surface and having positioning notches in its periphery; guide means leading to said turntable for sliding said disk onto the surface of said turntable; stop means mounted on said turntable and adapted to cooperate with the positioning notches in the periphery of said disk to control its location and angular orientation; thrust means for urging said disk against said stop means; clamp means for clamping said disk on said turntable, said thrust means and clamp means being retractable below the turntable surface during the slide-on portion of the disk-positioning operation, said guide means, stop means, thrust means and clamp means being cooperatively adapted to effect positioning of said disk on said turntable in substantially the same precise position previously occupied by said same disk with respect both to the center of the disk and to its angular orientation; means for rotating said turntable and the clamped disk; means for dynamically braking and stopping said turntable at an indexed position so related to said stop means and so aligned with said guide means as to facilitate rapid removal of said disk from, and placement of a succeeding disk on, said turntable; transducer means for recording information on the plane magnetic surface of said disk and for reading the recorded information therefrom; and means for utilizing said turntable-recorded timing signals to control the timing of said recording by said transducer means.

2. In a data processing system; a turntable having a plane magnetic under surface on which data and timing signals are magnetically recorded; a disk having at least one plane magnetic surface, said disk having positioning means adapted to cooperate with means on said turntable to position the disk with respect to its location and angular orientation; guide means for confining said disk to a slide-on path of travel the center line of which leads over the upper plane surface of said turntable to the center thereof; stop means carried by said turntable for stopping said disk when its center coincides with the axis of said turntable; thrust means carried by said turntable for urging said disk against said stop means for positioning said disk on said turntable in substantially precisely the same position previously occupied by said same disk with respect both to the center of said disk and its angular orientation; clamp means carried by said turntable for clamping said disk in said position, said thrust means and clamp means being adapted to be retracted below the turntable surface during the slide-on portion of the disk-positioning operation; means for rotating said turntable and clamp disk together; means for stopping said turntable in an indexed position, said indexed position being related to said stop means and to said guide means as to facilitate rapid removal of a disk from, and placement of a succeeding disk on, said turntable; means for magnetically recording bits of data on, and reading said bits of recorded data from, said disk clamped on and rotating with said turntable; and means for utilizing the timing signals recorded on the under surface of said turntable for controlling the times of said recording.

3. In a data storage system; a turntable having a plane magnetic surface on which timing signals are recorded; a disk removable with respect to said turntable and having at least one plane magnetic surface; positioning means on said turntable; means on said disk adapted to cooperate with said positioning means on said turntable for securing said disk on said turntable in substantially precisely the same position previously occupied by said same disk with respect both to the center of the disk and to its angular orientation; means for rotating said turntable and said secured disk together about a common axis; means for stopping said turntable at an indexed position so related to said disk-securing means as to facilitate rapid replacement of said disk with another; transducer means for magnetically recording bits of information on, and reading said recorded bits of information from said disk; and means for utilizing said turntable-recorded timing signals to control the times of said recording.

4. In a data processing system; a turntable having a plane magnetic surface on which signals are magnetically recorded; positioning means on said turntable; a disk having at least one plane magnetic surface, said disk being removable with respect to said turntable, said disk having means adapted to cooperate with said positioning means on said turntable to identify the angular orientation of said disk with respect to said turntable; clamp means for clamping said disk physically on said turntable in substantially precisely the same position previously occupied by said disk with respect both to the center of said disk and its angular orientation; means for rotating said turntable and said clamped disk together about their common axis; means for magnetically recording information on, and reading information from, the plane magnetic surface of said disk; and means for utilizing said turntable-recorded signals to control the times of said recording.

5. In a data memory system; a turntable rotatable about a fixed axis and having a magnetic surface on which timing signals are recorded; positioning means on said turntable; a disk having at least one plane magnetic surface, said disk being removable from said turntable, said disk having positioning means adapted to cooperate with said positioning means on said turntable to enable repeated placement of said disk on said turntable in substantially the same precise position previously occupied by said disk with respect both to the center of the disk and its angular orientation; means for physically securing said turntable and said disk together in said position for joint rotation; means for rotating said turntable and said disk together about said fixed axis; transducer means for magnetically recording digital information on, and reading the recorded information from, said disk; and means for utilizing the timing signals recorded on said turntable surface to control the times of said recording.

6. A turntable assembly comprising, in combination, a turntable having a portion on which timing signals are recorded, positioning means on the upper surface of the turntable arranged to receive a magnetic recording disk, said positioning means comprising a pair of stop members located on opposite sides of the upper surface of the turntable and having forward straight-edges located on substantially the transverse diameter of the turntable and having side edges generally converging toward one another, said stop members presenting an entrance therebetween for receiving a portion of a disk positioned on the turntable, a stationary disk sliding guide positioned alongside of and on substantially the level of the upper surface of the turntable, means for rotating said turntable, means for dynamically braking and stopping said turntable with the entrance formed by the stop members in line with the disk sliding guide, means juxtaposed to said turntable for sensing said timing signals as the turntable is rotated, and transducer means so positioned with respect to the turntable as to sense the magnetic recording on a disk positioned thereon, and means connected to said timing signal sensing means for utilizing said turntable-recorded timing signals to control the operation of said transducer means.

7. In a data storage system; a turntable; a disk removable with respect to said turntable, said disk having at least one plane magnetic surface and having positioning notches in its periphery; guide means leading to said turntable for sliding said disk onto the surface of said turntable; stop means mounted on said turntable and adapted to cooperate with the positioning notches in the periphery of said disk to control its location and angular orientation; thrust means for urging said disk against said stop means; clamp means for clamping said disk on said turntable, said thrust means and clamp means being retractable below the turntable surface during the slide-on portion of the disk-positioning operation, said guide means, stop means, thrust means and clamp means being cooperatively adapted to effect positioning of said disk on said turntable in substantially the same precise position previously occupied by said same disk with respect both to the center of the disk and to its angular orientation; means for rotating said turntable and the clamped disk; means for dynamically braking and stopping said turntable at an indexed position so related to said stop means and so aligned with said guide means as to facilitate rapid removal of said disk from, and placement of a succeeding disk on, said turntable, and transducer means for recording information on the plane magnetic surface of said disk and for reading the recorded information therefrom.

8. In a data processing system; a turntable, a disk having at least one plane magnetic surface, said disk having positioning means adapted to cooperate with means on said turntable to position the disk with respect to its location and angular orientation; guide means for confining said disk to a slide-on path of travel the center line of which leads over the upper plane surface of said turntable to the center thereof; stop means carried by said turntable for stopping said disk when its center coincides with the axis of said turntable; thrust means carried by said turntable for urging said disk against said stop means for positioning said disk on said turntable in substantially precisely the same position previously occupied by said same disk with respect both to the center of said disk and its angular orientation; clamp means carried by said turntable for clamping said disk in said position, said thrust means and clamp means being adapted to be retracted below the turntable surface during the slide-on portion of the disk-positioning operation; means for rotating said turntable and clamped disk together; means for stopping said turntable in an indexed position, said indexed position being related to said stop means and to said guide means as to facilitate rapid removal of a disk from, and placement of a succeeding disk on, said turntable; and means for magnetically recording bits of data on, and reading said bits of recorded data from, said disk clamped on and rotating with said turntable.

9. In a data storage system; a turntable, a disk removable with respect to said turntable and having at least one plane magnetic surface for continuous recording thereon during its rotational movement on said turntable; positioning means on said turntable; means on said disk adapted to cooperate with said positioning means on said turntable for securing said disk on said turntable in substantially precisely the same position previously occupied by said same disk with respect both to the center of the disk and to its angular orientation; means for unidirectionally rotating said turntable and said secured disk together about a common axis; means for stopping said turntable at a single indexed position so related to said disk-securing means as to facilitate rapid loading and subsequent replacement of said disk with another; and transducer means for magnetically recording bits of information on, reading said recorded bits of information from said disk; and means operatively related to said indexed position for controlling said transducer means.

10. In a data memory system; a turntable rotatable about a fixed axis, positioning means on said turntable; a disk having at least one plane magnetic surface for continuous recording thereon during its rotational movement on said turntable, said disk being removable from said turntable, said disk having positioning means adapted to cooperate with said positioning means on said turntable to enable repeated placement of said disk on said turntable in substantially the same precise position previously occupied by said disk with respect both to the center of the disk and its angular orientation; means for physically securing said turntable and said disk together in said position for joint rotation; means for unidirectionally rotating said turntable and said disk together about said fixed axis; and means for dynamically braking and stopping said turntable with the positioning means thereon in a single position with respect to a given side of the axis of rotation of the turntable to facilitate loading and unloading of said disk from said turntable.

11. A turntable assembly comprising, in combination, a turntable, positioning means on the upper surface of the turntable arranged to receive a magnetic recording disk, said positioning means comprising a pair of stop members located on opposite sides of the upper surface of the turntable and having forward straight-edges located on substantially the transverse diameter of the turntable and having side edges generally converging toward one another, said stop members presenting an entrance therebetween for receiving a portion of a disk positioned on the turntable, a stationary disk sliding guide positioned alongside of and on substantially the level of the upper surface of the turntable, means for rotating said turntable, means for dynamically braking and stopping said turntable with the entrance formed by the stop members in line with the disk sliding guide, and transducer means associated with the turntable and positionable for sensing the magnetic recording on a disk carried by the turntable.

12. A data memory assembly comprising, in combination, a turntable, positioning means on the upper surface of the turntable arranged to receive a magnetic recording disk, said positioning means comprising a pair of stop members located on opposite sides of the upper surface of the turntable and having forward straight-edges located on substantially the transverse diameter of the turntable and presenting an entrance therebetween for receiving a portion of a disk positioned on the turntable, a stationary disk sliding guide positioned alongside of and on substantially the level of the upper surface of the turntable, means for rotating said turntable, means for dynamically braking and stopping said turntable with the entrance formed by the pair of stop members in line with the disk sliding guide, and transducer means associated with the turntable and positionable for sensing the magnetic recording on a disk carried by the turntable.

13. A data memory assembly comprising, in combination, a turntable, positioning means on the upper surface of the turntable arranged to engage and properly seat a removable magnetic recording disk on the turntable, said positioning means comprising a pair of stop members located on opposite sides of the upper surface of the turntable and presenting an entrance therebetween for receiving a portion of a disk positioned on the turntable, a disk advancing guide positioned alongside of and on substantially the level of the upper surface of the turntable, means for rotating said turntable, means for dynamically braking and stopping said turntable with the entrance formed by the pair of stop members in line with the disk advancing guide, and transducer means associated with the turntable and positionable for sensing the magnetic recording on a disk carried by the turntable.

14. A data memory assembly comprising, in combination, a turntable, disk positioning means on the upper surface of the turntable arranged to seat a recording disk and enabling repeated placement of the disk on the turntable in substantially the same precise position previously occupied by the disk with respect both to the center of the disk and its angular orientation, said positioning means providing an entrance for slide-on movement of a disk onto the upper surface of the turntable, a disk sliding guide positioned alongside of and on substantially the level of the upper surface of the turntable, means for rotating said turntable, means for braking and stopping said turntable with the entrance of the positioning means in line with the disk sliding guide, and clamping means carried by the turntable for clamping such a disk in said position, said clamping means being retractible below the upper surface of the turntable during the slide-on movement of a disk.

15. A data memory assembly comprising, in combination, a turntable, positioning means on a surface of the turntable arranged to receive and seat a recording disk on the turntable for joint rotation therewith, said disk having a plane magnetic surface for continuous recording thereon during its rotational movement on said turntable, said positioning means forming an entrance for receiving a portion of a disk positioned on the turntable, a disk advancing guide at one side of and on substantially the level of the upper surface of the turntable to facilitate loading and unloading of said disk, means for unidirectionally rotating said turntable, and means for braking and stopping said turntable with the entrance formed by the positioning means in line with the disk advancing guide.

References Cited in the file of this patent

UNITED STATES PATENTS

| | | |
|---|---|---|
| 2,722,676 | Begun | Nov. 1, 1955 |
| 2,739,299 | Burkhart | Mar. 20, 1956 |
| 2,846,661 | Cunningham | Aug. 5, 1958 |
| 2,847,223 | Taylor | Aug. 12, 1958 |
| 2,937,916 | Hohnecker | May 24, 1960 |